United States Patent
Shin et al.

(10) Patent No.: US 11,491,902 B2
(45) Date of Patent: Nov. 8, 2022

(54) DEVICE FOR ADJUSTING POSITION OF HEADREST FOR VEHICLE

(71) Applicants: HYUNDAI MOTOR COMPANY, Seoul (KR); KIA CORPORATION, Seoul (KR)

(72) Inventors: Seong Hyeon Shin, Suwon-si (KR); Sang Hyun Lee, Anyang-si (KR); Seong Mun Yun, Hwaseong-si (KR); Seon Chae Na, Yongin-si (KR); Byung Yong Choi, Hwaseong-si (KR); Sang Ho Kim, Incheon (KR); Hyeong Jong Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/365,616

(22) Filed: Jul. 1, 2021

(65) Prior Publication Data
US 2022/0161701 A1 May 26, 2022

(30) Foreign Application Priority Data
Nov. 20, 2020 (KR) .................. 10-2020-0156180

(51) Int. Cl.
*B60N 2/80* (2018.01)
*B60N 2/829* (2018.01)
*B60N 2/853* (2018.01)
*A47C 1/036* (2006.01)
*A47C 1/10* (2006.01)
(Continued)

(52) U.S. Cl.
CPC .............. *B60N 2/829* (2018.02); *B60N 2/853* (2018.02); *A47C 1/036* (2013.01); *A47C 1/10* (2013.01); *A47C 7/38* (2013.01); *A47C 7/383* (2013.01); *B60N 2/865* (2018.02); *B60N 2/868* (2018.02)

(58) Field of Classification Search
CPC ........ B60N 2/865; B60N 2/868; B60N 2/829; B60N 2/853; A47C 1/036; A47C 1/10; A47C 7/38; A47C 7/383
See application file for complete search history.

(56) References Cited

U.S. PATENT DOCUMENTS 638,534 A * 12/1899 Welch et al. .......... B60N 2/885
297/410
671,299 A * 4/1901 Sibley ..................... A47C 7/38
297/410
(Continued)

*Primary Examiner* — Syed A Islam
(74) *Attorney, Agent, or Firm* — Lempia Summerfield Katz LLC

(57) ABSTRACT

A device for adjusting a position of a headrest for a vehicle includes: a stay mounted on a seatback frame; a main frame including a rotation guide hole, inserted into and mounted on the stay, and configured to ascend or descend along the stay; an elevation device mounted on the main frame and the stay, and configured to allow the main frame to ascend or descend along the stay; a rotating frame including a first end portion inserted into the stay and configured to ascend or descend along the stay, and a second end portion extending toward the rotation guide hole of the main frame; a rotating device mounted on the rotating frame and the rotation guide hole of the main frame, and configured to rotate the rotating frame along the rotation guide hole; and a headrest frame assembled to the rotating frame.

12 Claims, 17 Drawing Sheets

(51) Int. Cl.
    *A47C 7/38*         (2006.01)
    *B60N 2/865*      (2018.01)
    *B60N 2/868*      (2018.01)

(56) References Cited

U.S. PATENT DOCUMENTS

| | | | | |
|---|---|---|---|---|
| 830,826 | A * | 9/1906 | DeFonter | B60N 2/865 297/404 |
| 1,371,201 | A * | 3/1921 | Driver | A47C 1/06 297/407 |
| 3,035,865 | A * | 5/1962 | Schirmer | A45D 20/32 297/391 |
| 3,537,749 | A * | 11/1970 | Putsch | B60N 2/853 297/362 |
| 3,877,751 | A * | 4/1975 | Rasmussen | A61G 15/125 297/410 |
| 4,350,389 | A * | 9/1982 | Parsson | A47C 7/38 297/391 |
| 5,213,395 | A * | 5/1993 | Korteweg | A47C 1/022 297/423.46 |
| 6,607,242 | B2 * | 8/2003 | Estrada | B60N 2/888 297/216.12 |
| 9,352,675 | B2 * | 5/2016 | Walker | B60N 2/85 |
| 9,487,114 | B2 * | 11/2016 | Falster | B60N 2/829 |
| 10,681,986 | B1 * | 6/2020 | Sanders | A45D 44/10 |
| 11,148,568 | B2 * | 10/2021 | Hong | B60N 2/838 |
| 11,166,560 | B2 * | 11/2021 | Chen | A47C 7/38 |
| 11,235,691 | B2 * | 2/2022 | Mihm | B60N 2/829 |
| 2019/0160985 | A1 * | 5/2019 | Yu | B60N 2/829 |
| 2020/0062145 | A1 * | 2/2020 | Little | B60N 2/868 |

* cited by examiner

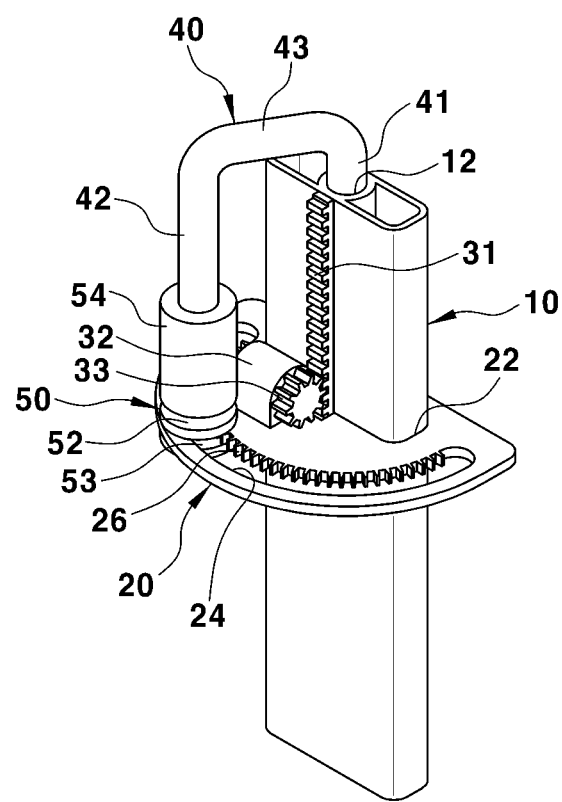

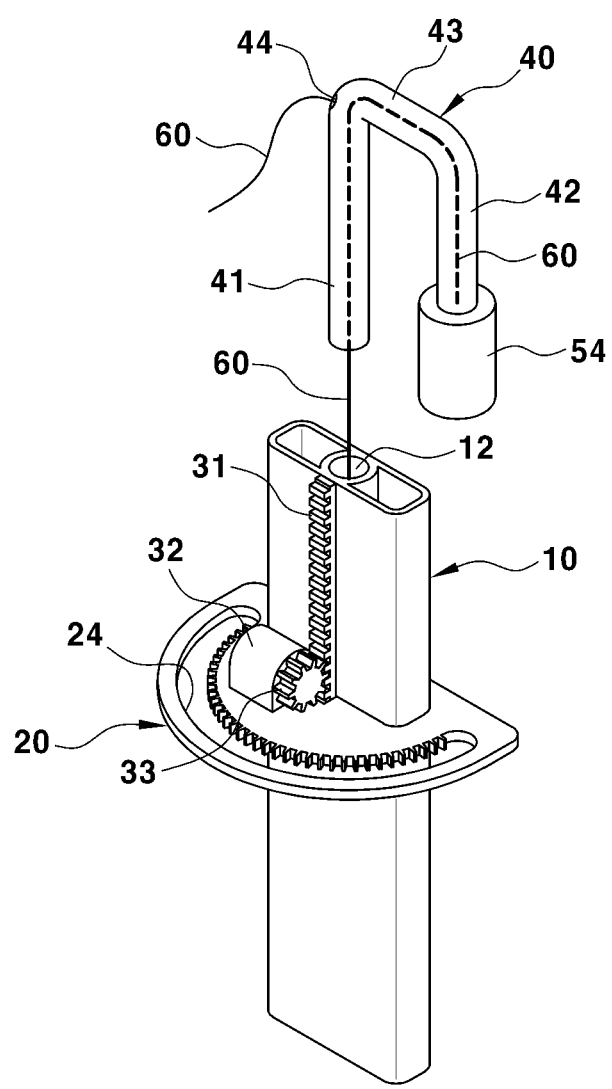

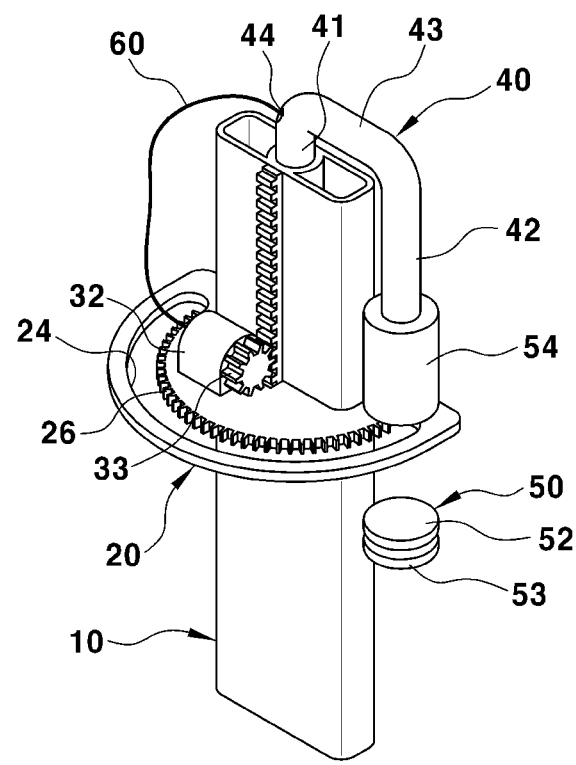

[ DRIVING MODE ]

[ REST MODE ]

DEVICE FOR ADJUSTING POSITION OF HEADREST FOR VEHICLE

CROSS-REFERENCE TO RELATED APPLICATION

This application claims priority to and the benefit of Korean Patent Application No. 10-2020-0156180, filed on Nov. 20, 2020, the entire contents of which are incorporated herein by reference.

FIELD

The present disclosure relates to a device for adjusting a position of a headrest for a vehicle.

BACKGROUND

The statements in this section merely provide background information related to the present disclosure and may not constitute prior art.

As is well known, a seat for a vehicle includes a seat cushion for allowing a lower body of a passenger to sit, a seatback for allowing passenger's waist and back to lean thereagainst, and a headrest for supporting passenger's head and neck.

Mechanism components for adjusting a height and a tilting angle in a front-rear direction are installed in the headrest so that the height and tilting angle of the headrest may be adjusted according to a body condition of the passenger.

In such an existing headrest, a support surface capable of supporting the head and neck of the passenger is limited to a front surface of the headrest, and a rear surface is not used.

In particular, in order to safely protect the passenger when a vehicle collision accident occurs, it is more advantageous in that a distance between the headrest and the passenger's head is small. However, in the case in which the passenger tilts his or her head backward for a rest, when the headrest is too close to the head, the head cannot be tilted backward, so the passenger may be uncomfortable.

SUMMARY

In one form, the present disclosure provides a device for adjusting a position of a headrest for a vehicle, in which a front surface and a rear surface of a headrest are formed of support surfaces having different functions, and thus the front surface and the rear surface may be selectively used by reversely rotating the headrest, as necessary, so that the device is capable of satisfying both of a function of safely supporting a passenger's head during driving and a function of comfortably supporting the passenger's head while the passenger takes a rest.

In one form, the present disclosure provides a device for adjusting a position of a headrest for a vehicle, which includes: a stay fixed to and mounted on a seatback frame; a main frame provided in a structure in which a rotation guide hole and inserted into and mounted on the stay to be ascendable or descendable; an elevation device mounted on the main frame and the stay, and configured to allow the main frame to ascend or descend; a rotating frame having a first end portion inserted into the stay to be ascendable or descendable and a second end portion extending toward the rotation guide hole of the main frame; a rotating device mounted on the rotating frame and the rotation guide hole of the main frame and configured to rotate the rotating frame along the rotation guide hole; and a headrest frame assembled to the rotating frame.

The elevation device may include a rack mounted on one surface of the stay in a vertical direction, a first motor mounted on the main frame, and a first pinion mounted on an output shaft of the first motor and engaged with the rack.

The rotating device may include a sector gear formed on an inner surface of the rotation guide hole of the main frame, a second motor mounted on the second end portion of the rotating frame, and a rotating gear body mounted on an output shaft of the second motor and rotatably inserted into the rotation guide hole and, simultaneously, engaged with the sector gear.

The rotating gear body may include a second pinion engaged with the sector gear, an upper stopper plate attached on an upper surface of the second pinion to be in close contact with an outer circumferential surface of an upper side of the rotation guide hole, and a lower stopper plate attached to a lower surface of the second pinion to be in close contact with an outer circumferential surface of a lower side of the rotation guide hole.

The rotating frame may include a first vertical bar inserted into the stay to be ascendable or descendable, a second vertical bar extending toward the rotation guide hole of the main frame, and a horizontal bar connected between the first vertical bar and the second vertical bar and assembled with the headrest frame to be integrally formed in an inverted "U" shape.

The headrest frame may be provided in a structure in which a front frame and a rear frame which are mutually assembled and in which assembly grooves, which the horizontal bar is inserted into and engaged with, are formed on inner surfaces of the front frame and the rear frame.

An elevation guide hole through which the first vertical bar of the rotating frame is inserted to be ascendable or descendable may be formed in the stay.

Preferably, the rotating frame may be provided in a hollow structure into which a wiring extending from an inside of the stay is inserted to extend toward the second motor.

More preferably, a wiring branch hole may be formed in the rotating frame to allow the wiring to branch to be connected to the first motor.

The headrest frame may be covered with a headrest pad, which includes a first pad configured to support a head of a passenger during driving, and a second pad having a thickness that is thinner than a thickness of the first pad and configured to support the head of the passenger while the passenger takes a rest.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is an assembled perspective view illustrating a device for adjusting a position of a headrest for a vehicle according to one form of the present disclosure;

FIGS. 3A, 3B, 3C, 3D and 3E are diagrams illustrating an assembly structure of a rotating frame among the components of the device for adjusting a position of a headrest for a vehicle according to one form of the present disclosure;

Figure 2A:
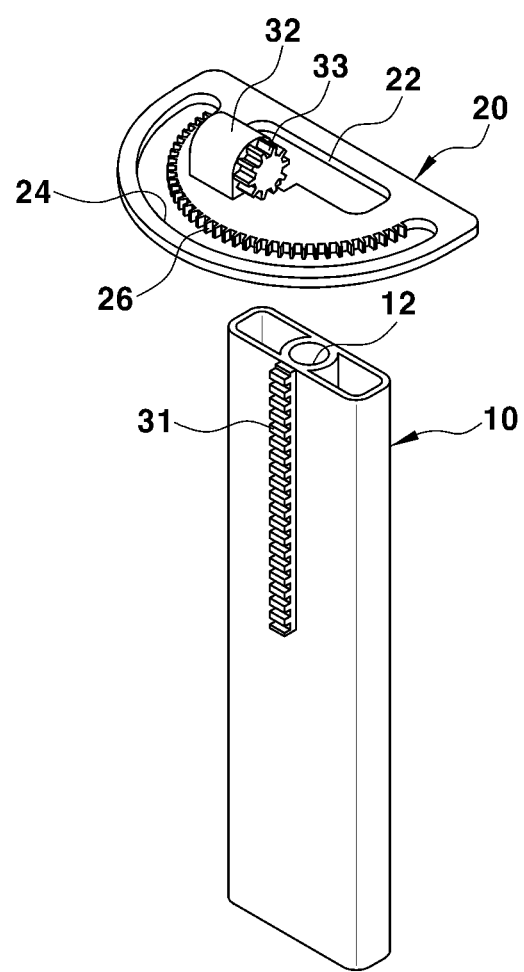
FIGS. 2A and 2B are perspective views illustrating a process in which a main frame is assembled to a stay among components of the device for adjusting a position of a headrest for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in detail with reference to the accompanying drawings.

Figure 2B:
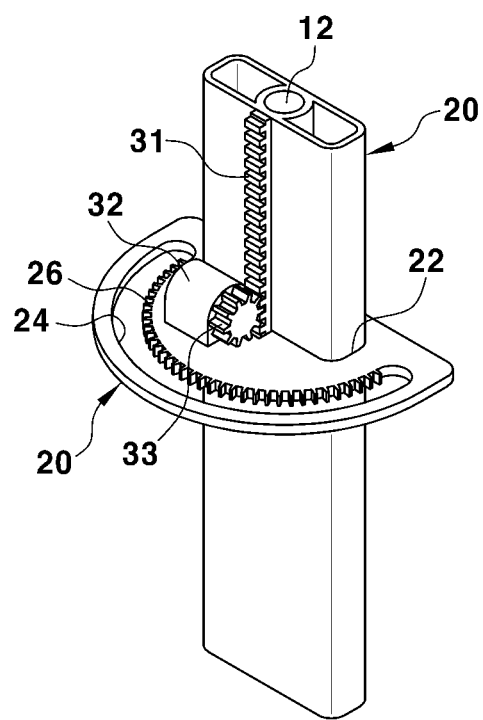

FIG. 1 is an assembled perspective view illustrating a device for adjusting a position of a headrest for a vehicle according to one form of the present disclosure, FIGS. 2A and 2B are diagrams illustrating a process in which a main frame is assembled to a stay, FIGS. 3A to 3D are diagrams illustrating a process in which a rotating frame is assembled to the stay, and a reference numeral 10 indicates the stay in each drawing.

The stay 10 has a monopost structure for supporting a headrest, and a lower end portion of the stay 10 is mounted on and fixed to a seatback frame.

A main frame 20 is inserted into and mounted on the stay 10 to be ascendable or descendable.

The main frame 20 is a semi-circular plate structure in which a through-hole 22 into which the stay 10 is inserted is formed in a portion of one side of an arc shape and a curved rotation guide hole 24 is formed in a portion of the other side of the arc shape.

In addition, an elevation device for lifting the main frame 20 up or down is mounted on the main frame 20 and the stay 10.

As shown in FIGS. 2A and 2B, the elevation device includes a rack 31 mounted on one surface of the stay 10 in a vertical direction, a first motor 32 mounted at a predetermined position on an upper surface of the main frame 20, and a first pinion 33 mounted on an output shaft of the first motor 32 and engaged with the rack 31.

Accordingly, when the first motor 32 is driven, the first pinion 33 ascends or descends along the rack 31 so that the main frame 20 may ascend or descend along the stay 10.

A rotating frame 40 is rotatably assembled between the stay 10 and the main frame 20.

The rotating frame 40 is formed in the form of a pipe which is bent in an inverted "U" shape, one end of the rotating frame 40 is inserted into the stay 10 to be ascendable or descendable, and the other end thereof extends toward the rotation guide hole 24 of the main frame 20.

More specifically, the rotating frame 40 is provided in a structure including a first vertical bar 41 inserted into the stay 10 to be ascendable or descendable, a second vertical bar 42 extending toward the rotation guide hole 24 of the main frame 20, and a horizontal bar 43 connected between the first vertical bar 41 and the second vertical bar 42 and assembled with the headrest frame to be integrally formed in an inverted "U" shape.

Preferably, in order to inhibit movement of the first vertical bar 41 which is a center point of rotation of the rotating frame 40, an elevation guide hole 12 into which the first vertical bar 41 of the rotating frame 40 is inserted to be ascendable or descendable is formed in the stay 10.

In addition, a rotating device for rotating the rotating frame 40 along the rotation guide hole 24 is assembled in the rotating frame 40 and the rotation guide hole 24 of the main frame 20.

As shown in FIGS. 3A to 3D, the rotating device may include a sector gear 26 formed on an inner surface of the rotation guide hole 24 of the main frame 20, a second motor 54 mounted on the second vertical bar 42 which is the other end portion of the rotating frame 40, and a rotating gear body 50 mounted on an output shaft of the second motor 54 and rotatably inserted into the rotation guide hole 24 of the main frame 20 and, simultaneously, engaged with the sector gear 26.

Figure 3C:
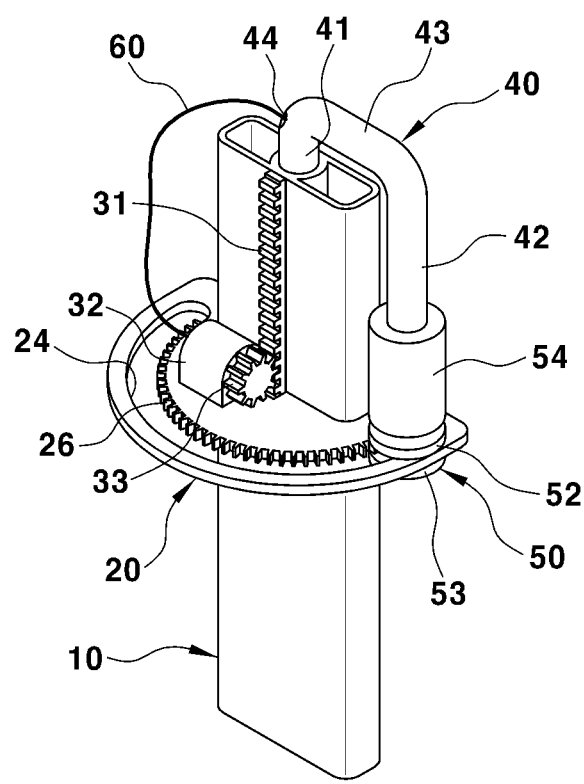
Figure 3D:
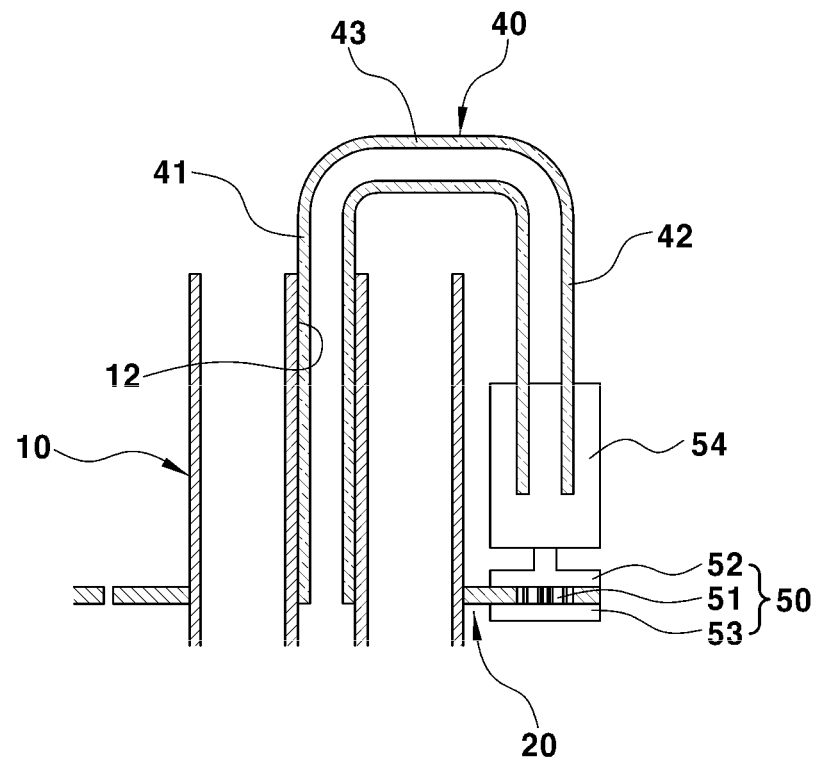
Figure 3E:
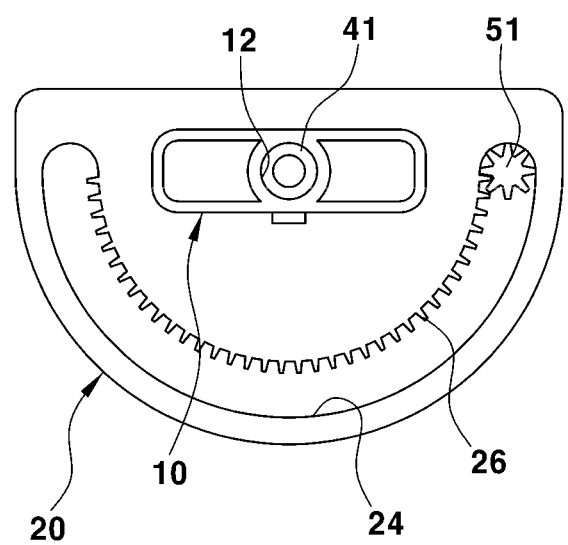

Preferably, as can be seen well in FIGS. 3D and 3E, the rotating gear body 50 may include a second pinion 51 engaged with the sector gear 26, an upper stopper plate 52 attached to an upper surface of the second pinion 51 to be in close contact with an outer circumferential surface of an upper side of the rotation guide hole 24, and a lower stopper plate 53 attached to a lower surface of the second pinion 51 to be in close contact with an outer circumferential surface of a lower side of the rotation guide hole 24.

Thus, the second pinion 51 is engaged with the sector gear 26 of the main frame 20, and the upper stopper plate 52 and the lower stopper plate 53 are also in close contact with the upper surface and the lower surface of the main frame 20 based on the rotation guide hole 24 so that the main frame 20 and the rotating frame 40 are in a state of being mutually assembled, and when the main frame 20 ascends or descends, the rotating frame 40 may also be in a state of being ascendable or descendable.

Meanwhile, in order to install a wiring 60 for supplying power to the first motor 32 and the second motor 54, the rotating frame 40 is provided in a hollow pipe structure such that the wiring 60 extending from an interior of the stay 10 is inserted to pass through the rotating frame 40.

In addition, a wiring branch hole 44 is formed at the rotating frame 40 such that the wiring 60 branches to be connected to the first motor 32.

Thus, as shown in FIG. 3A, the wiring 60 connected to a power source passes through the interior of the stay 10, passes through an interior of the rotating frame 40, and then is connected to the second motor 54, and, as shown in FIGS. 3B and 3C, the wiring 60 branches and extends toward the outside through the wiring branch hole 44 to be connected to the first motor 32 so that power may be easily supplied to the first motor 32 and the second motor 54.

Next, a headrest frame 70 is assembled to the rotating frame 40.

Figure 4A:
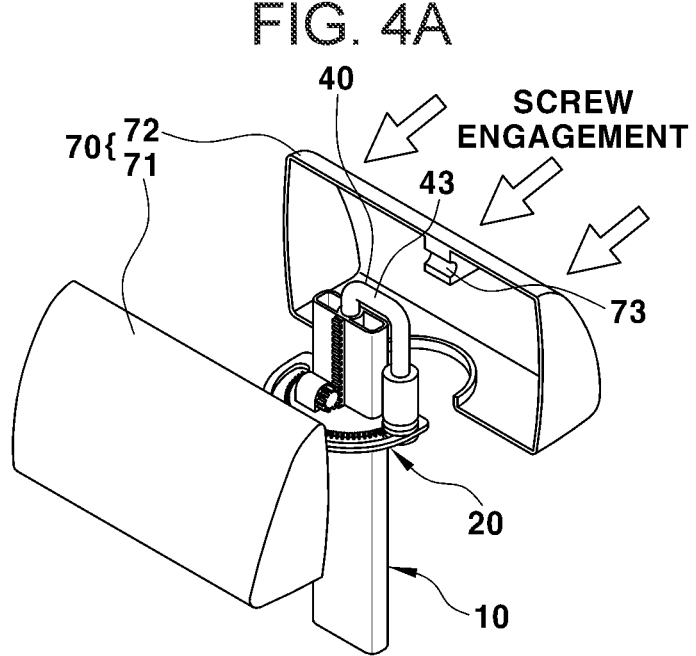
FIGS. 4A and 4B are diagrams illustrating an assembly structure of a headrest frame among the components of the device for adjusting a position of a headrest for a vehicle according to one form of the present disclosure.
Figure 4B:
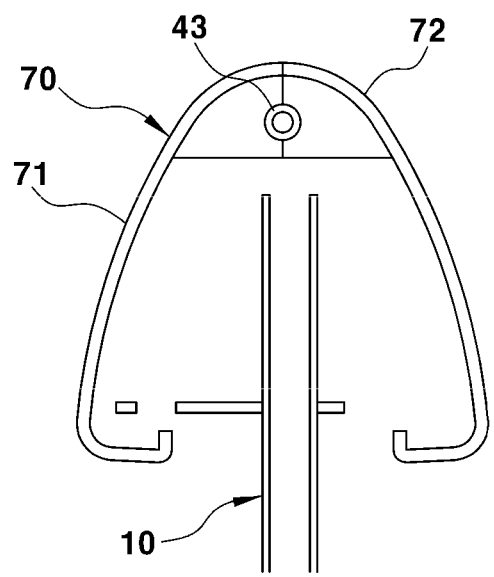

Referring to FIGS. 4A and 4B, the headrest frame 70 is formed of a front frame 71 and a rear frame 72 which are mutually engaged with each other, and assembly grooves 73, which is configured to receive and engage with the horizontal bar 43 of the rotating frame 40, are formed on inner surfaces of the front frame 71 and the rear frame 72.

Thus, the horizontal bar 43 of the rotating frame 40 is inserted into and located in the assembly grooves 73, and then the front frame 71 and the rear frame 72 are mutually assembled through a screw or the like so that the headrest frame 70 is in a state of being fixedly mounted on the rotating frame 40, and thus when the rotating frame 40 is rotated or ascends, the headrest frame 70 may also be operated to be rotated or to ascend or descend.

Subsequently, a headrest pad 80 for providing an actual support skin surface to the headrest frame 70 is mounted.

Figure 5:
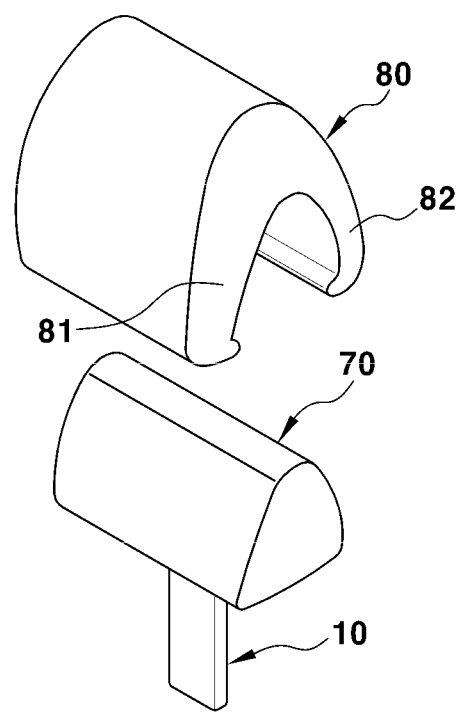
FIG. 5 is a perspective view illustrating that a headrest pad is assembled to the headrest frame among the components of the device for adjusting a position of a headrest for a vehicle according to one form of the present disclosure.

Referring to FIG. 5, the headrest pad 80 has a structure in which a first pad 81 for supporting a passenger's head during driving and a second pad 82 having a thickness that is smaller than a thickness of the first pad 81 to support the passenger's head while the passenger takes a rest are integrated.

The headrest pad 80 is attached to a surface of the headrest frame 70 to cover the headrest frame 70 so that the first pad 81 may be located on a front surface of the headrest and the second pad 82 may be located on a rear surface of the headrest.

Meanwhile, after a process of attaching the headrest pad 80 to the headrest frame 70 to cover the headrest frame 70, the stay 10 is fixed to a seatback frame 90.

Figure 6:
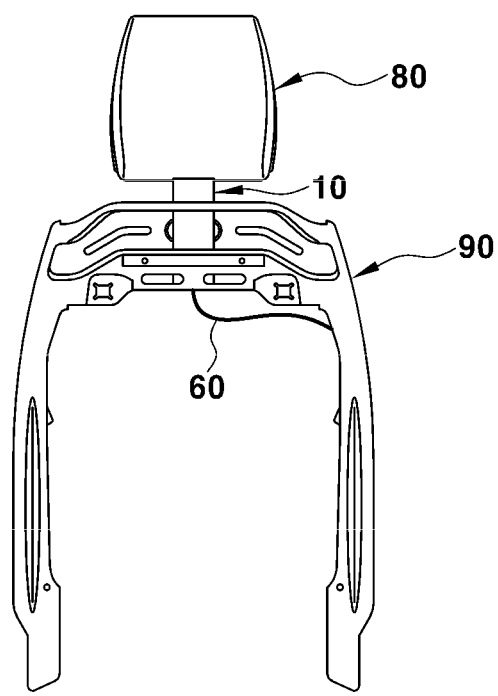
FIG. 6 is a front view illustrating that the stay is assembled to a seatback frame among the components of the device for adjusting a position of a headrest for a vehicle according to one form of the present disclosure.

Referring to FIG. 6, the lower end portion of the stay 10 is inserted into and located at a central portion of the seatback frame 90, and then the stay 10 is mounted on the seatback frame 90 via a bolt or the like so that the stay 10 may be fixed in a state of being vertically erected.

Here, an operation flow of the device for adjusting a position of a headrest for a vehicle according to one form of the present disclosure will be described as follows.

FIGS. 7A to 7D are diagrams sequentially illustrating an example of the operation flow of the device for adjusting a position of a headrest for a vehicle according to one form of the present disclosure.

When the first motor 32 is driven and thus the output shaft thereof is rotated in one direction, the first pinion 33 is rotated in the one direction to ascend along the rack 31 which is installed in the stay 10.

Figure 7A:
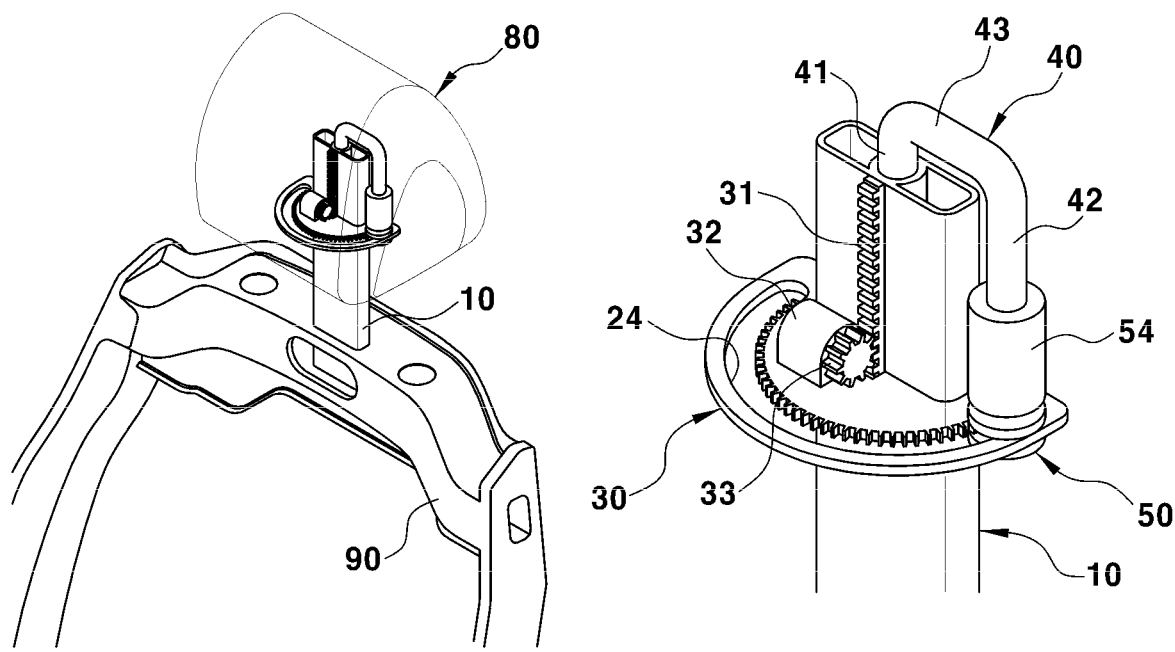
FIGS. 7A, 7B, 7C and 7D are diagrams sequentially illustrating an example of an operation flow of the device for adjusting a position of a headrest for a vehicle according to one form of the present disclosure.
Figure 7B:
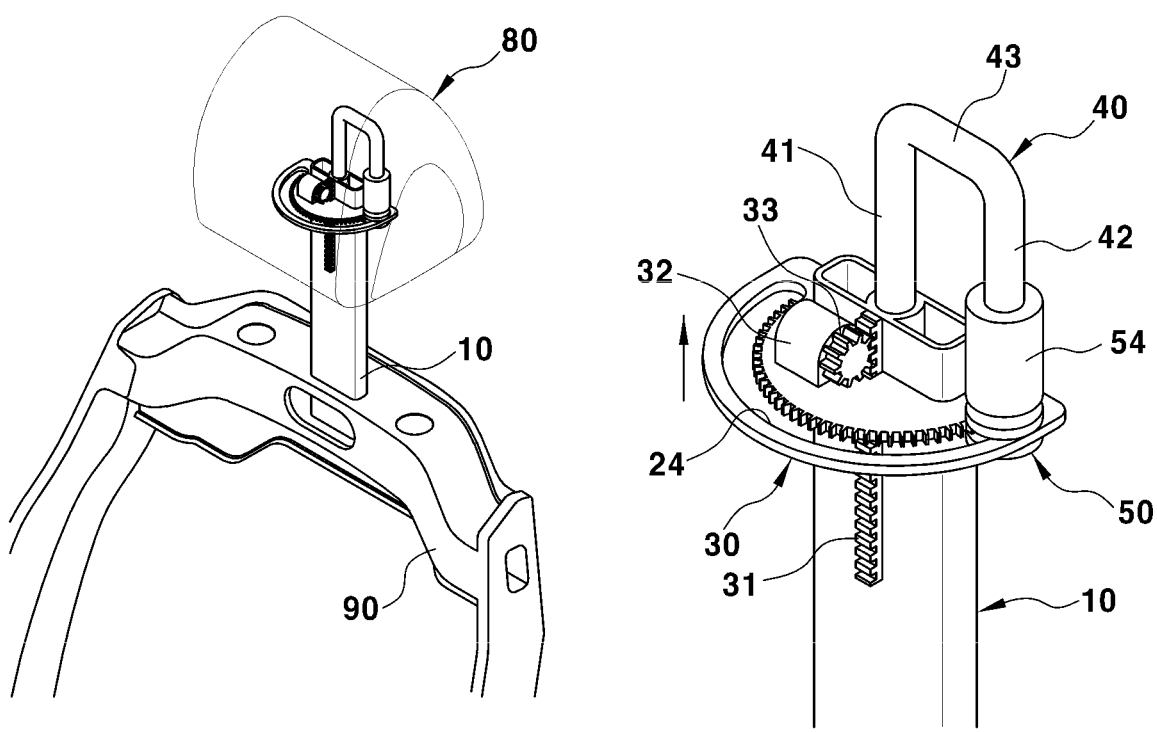

In this case, since the first motor 32 is in a state of being mounted on the main frame 20, the second motor 54 is in a state of being connected to the rotating frame 40, and the rotating gear body 50 connected to the output shaft of the second motor 54 is in the state of being inserted into the rotation guide hole 24 of the main frame 20, both of the main frame 20 and the rotating frame 40 ascend from a lowest position shown in FIG. 7A to an uppermost position shown in FIG. 7B.

Simultaneously, the headrest frame 70 and the headrest pad 80, which are assembled to the rotating frame 40, ascend so that a height adjustment of the headrest may be performed.

Meanwhile, when the second motor 54 is driven and the output shaft thereof is rotated in one direction so as to rotate the headrest at an angle of 180 degrees, the rotating gear body 50 connected to the output shaft of the second motor 54 is rotated along the rotation guide hole 24 of the main frame 20.

Figure 7C:
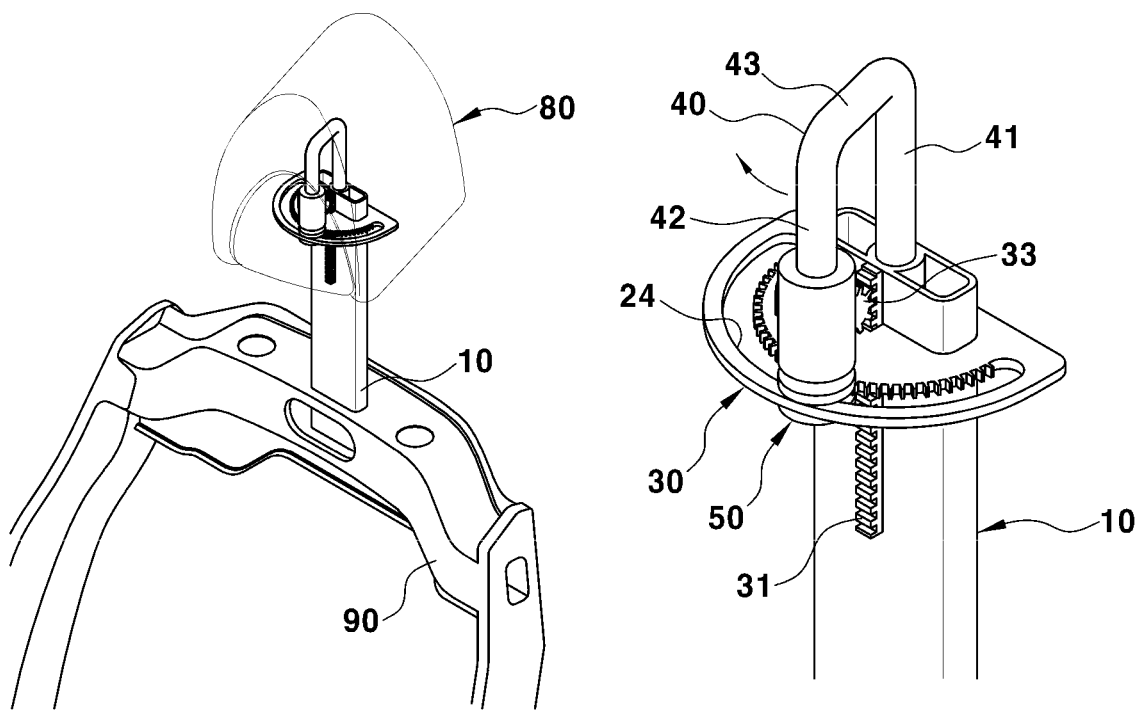
Figure 7D:
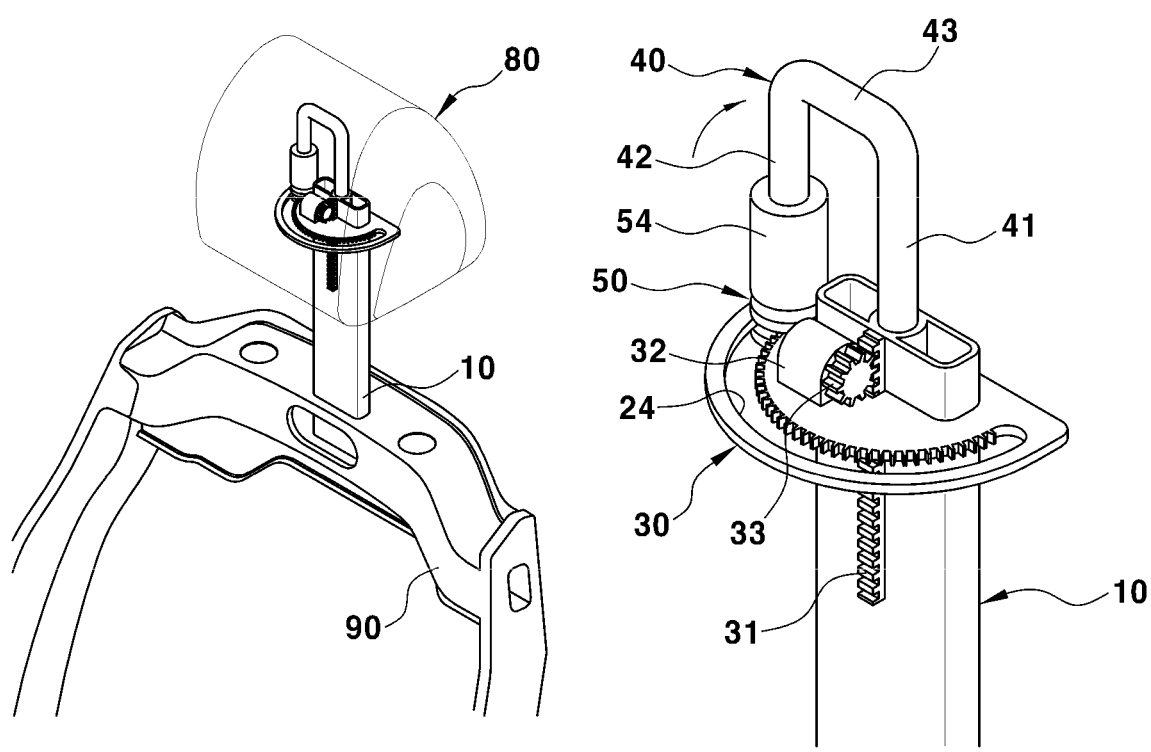

That is, as shown in FIGS. 7C and 7D, the second pinion 51 of the rotating gear body 50 is moved along the sector gear 26 formed in the rotation guide hole 24 so that the rotating frame 40 is rotated.

More specifically, the second pinion 51 of the rotating gear body 50 is moved along the sector gear 26 formed in the rotation guide hole 24 so that the horizontal bar 43 and the second vertical bar 42 are rotated at an angle of 180 degrees about the first vertical bar 41 of the rotating frame 40.

Therefore, the rotating frame 40 is rotated at the angle of 180 degrees, the headrest frame 70 and the headrest pad 80, which are assembled to the rotating frame 40, are rotated at the angle of 180 degrees so that a reverse rotation of the headrest is performed, and thus the first pad 81 may be located on the front surface of the headrest. Simultaneously, the second pad 82 may be located on the rear surface of the headrest, or the second pad 82 may be located on the front surface of the headrest and, simultaneously, the first pad 81 may be located on the rear surface of the headrest.

Figure 8:
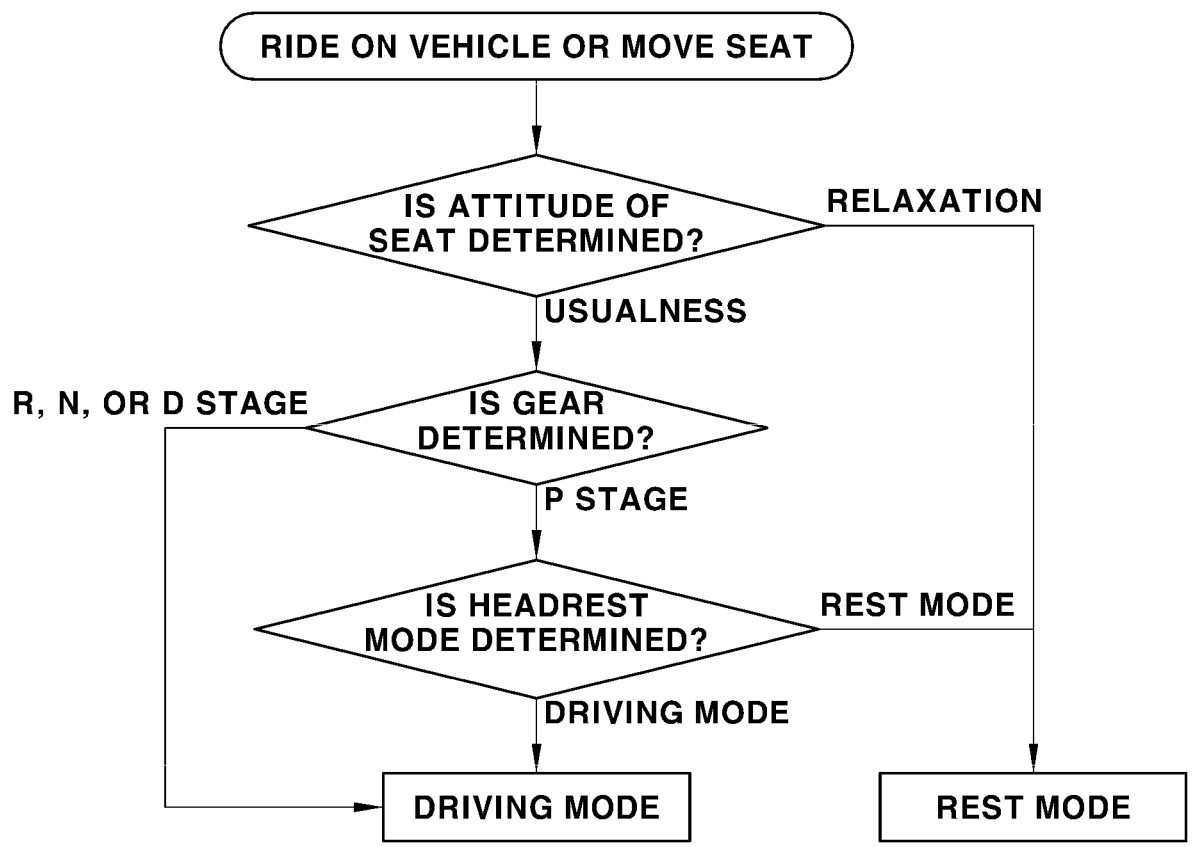
FIG. 8 is a flowchart illustrating an example of the operation flow of the device for adjusting a position of a headrest for a vehicle according to one form of the present disclosure.

FIG. 8 is a control flowchart illustrating an example of the operation flow of the device for adjusting a position of a headrest for a vehicle according to one form of the present disclosure.

In the case of an electric seat, it is possible to perform a relaxation position adjustment such that a seatback is reclined backward due to driving of a motor and, simultaneously, a seat cushion is tilted due to the driving of the motor.

Thus, a controller may determine whether an attitude of the electric seat is a relaxation position or an original usual position through a motor driving signal for reclining the seatback or tilting the seat cushion.

In addition, the controller may determine whether a gear shift lever of the vehicle is located at a parking (P) stage or located at a rear (R), neutral (N), or driving (D) stage.

When the electric seat is the normal position and the gear shift lever is in the R, N, or D stage, the controller determines that the vehicle is traveling to select a driving mode and control the headrest in the driving mode so that, as described above, the first pad 81 may be located on the front surface of the headrest and, simultaneously, the second pad 82 may be located on the rear surface of the headrest.

Figure 9A:
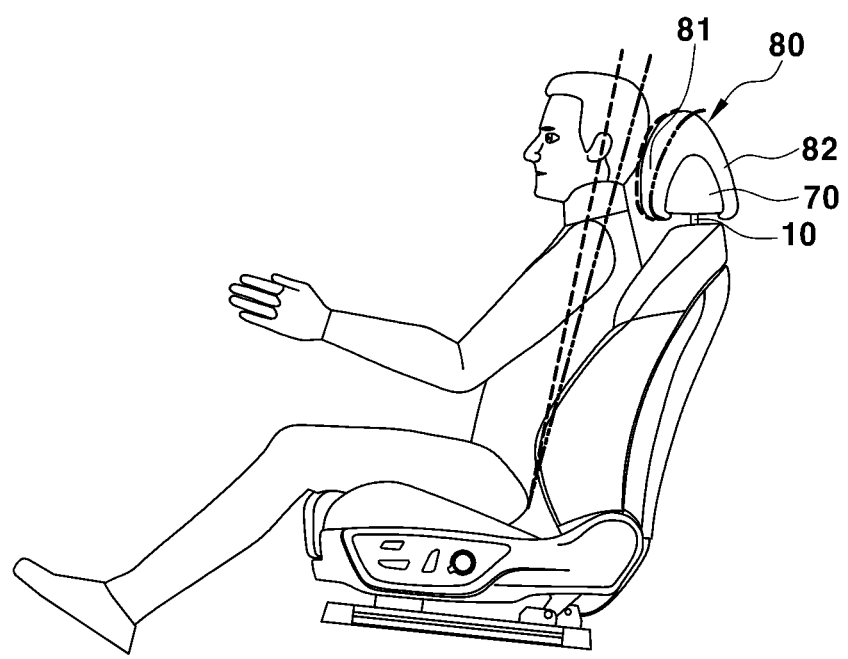
FIGS. 9A and 9B are side views showing a usage example of the headrest by the device for adjusting a position of a headrest for a vehicle according to one form of the present disclosure.

In this case, as shown in FIG. 9A, since the first pad 81 of the headrest pad 80 is applied as being thicker than the second pad 82, a skin support surface of the first pad 81 is located close to the passenger's head.

Therefore, the first pad 81, which is formed to be thick so as to be close to the passenger's head while the vehicle is traveling, is located on the front surface so that the passenger's head may be safely supported during traveling.

Meanwhile, when the seat is in a state of the relaxation position and the gear shift lever is located at a P stage, the controller determines that the rest is possible to select a rest mode and control the headrest in the rest mode so that the headrest is rotated at an angle of 180 degrees as described above. Thus, the second pad 82 may be located on the front surface of the headrest and, simultaneously, the first pad 81 may be located on the rear surface of the headrest.

Figure 9B:
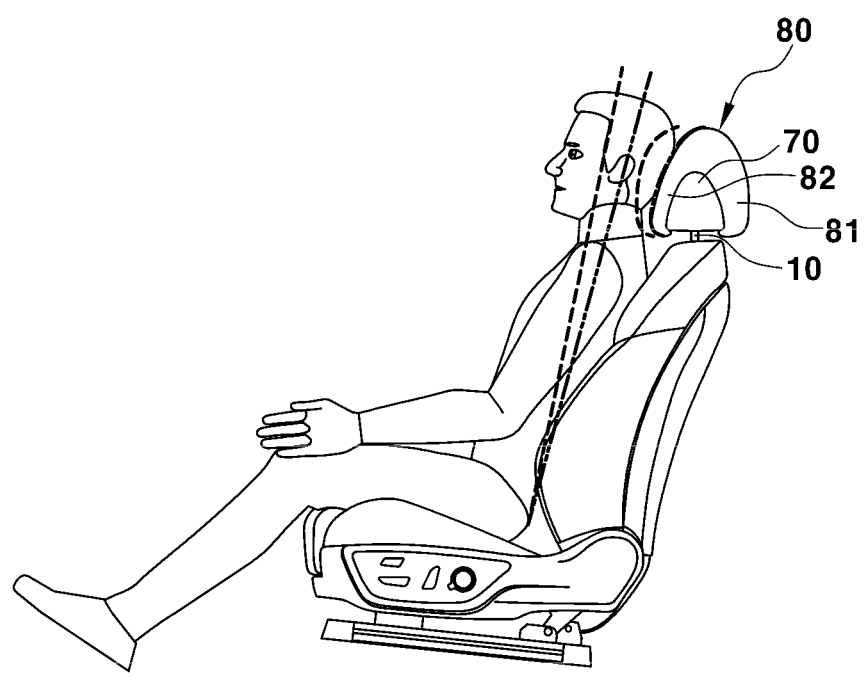

In this case, as shown in FIG. 9B, since the second pad 82 of the headrest pad 80 is applied as being thinner than the first pad 81, the passenger's head may be comfortably tilted backward and thus supported on a skin support surface of the second pad 82.

Thus, while the passenger takes a rest, the headrest is reversely rotated and thus the second pad 82 in which the headrest pad is formed to be thin so as to allow the passenger's head to be tilted is located on the front surface so that the passenger's head may be comfortably supported while the passenger takes a rest.

The present disclosure provides the following effects and advantages.

First, during driving, a first pad formed on a front surface portion of a headrest (a portion in which a headrest pad is formed to be thick so as to be close to a passenger's head) is located on a front surface so that the passenger's head can be safely supported during driving.

Second, while the passenger takes a rest, the headrest is reversely rotated and thus a second pad formed on a rear surface portion of the headrest (a portion in which a headrest pad is formed to be thin so as to allow the passenger's head to be tilted) is located on the front surface so that the passenger's head may be comfortably supported while the passenger takes a rest.

While various forms of the present disclosure have been described with reference to the accompanying drawings, a person skilled in the art to which the present disclosure pertains may understand that the present disclosure can be implemented in other specific form without departing from the technical spirit and essential features of the present disclosure. Therefore, it should be understood that the above-described forms are not restrictive but illustrative in all aspects.

What is claimed is:

1. A device for adjusting a position of a headrest for a vehicle, the device comprising:
   a stay mounted on a seatback frame;
   a main frame movably mounted on the stay and configured to ascend or descend along the stay, wherein the main frame includes a rotation guide hole;
   an elevation device mounted on the main frame and the stay, and configured to allow the main frame to ascend or descend along the stay;
   a rotating frame including
     a first end portion inserted into the stay and configured to ascend or descend along the stay, and
     a second end portion extending toward the rotation guide hole of the main frame;
   a rotating device mounted on the rotating frame and the rotation guide hole of the main frame, and configured to rotate the rotating frame along the rotation guide hole; and
   a headrest frame assembled to the rotating frame.

2. The device of claim 1, wherein the elevation device includes:
   a rack mounted on one surface of the stay in a vertical direction;
   a first motor mounted on the main frame and including an output shaft; and
   a first pinion mounted on the output shaft of the first motor and engaged with the rack.

3. The device of claim 1, wherein the rotating device includes:
   a sector gear formed on an inner surface of the rotation guide hole of the main frame;
   a second motor mounted on the second end portion of the rotating frame; and
   a rotating gear body mounted on an output shaft of the second motor, and configured to be rotatably inserted into the rotation guide hole and, simultaneously, to engage with the sector gear.

4. The device of claim 3, wherein the rotating gear body includes:
   a second pinion engaged with the sector gear;
   an upper stopper plate attached on an upper surface of the second pinion and provided in close contact with an outer circumferential surface of an upper side of the rotation guide hole; and
   a lower stopper plate attached to a lower surface of the second pinion and provided in close contact with an outer circumferential surface of a lower side of the rotation guide hole.

5. The device of claim 1, wherein the rotating frame includes:
   a first vertical bar inserted into the stay and configured to ascend or descend;
   a second vertical bar extending toward the rotation guide hole of the main frame; and
   a horizontal bar connected between the first vertical bar and the second vertical bar, assembled with the headrest frame, and integrally formed in an inverted "U" shape.

6. The device of claim 5, wherein the headrest frame comprises:
   a front frame;
   a rear frame; and
   assembly grooves formed on inner surfaces of the front frame and the rear frame, and configured to receive and engage with the horizontal bar,
   wherein the front frame and the rear frame are mutually assembled.

7. The device of claim 5, further comprising an elevation guide hole formed in the stay, and configured to receive the first vertical bar of the rotating frame and to allow the first vertical bar to ascend or descend.

8. The device of claim 5, wherein the rotating frame is provided in a hollow structure, and is configured to receive a wiring extending from an inside of the stay and allow the wiring to extend toward a second motor.

9. The device of claim 8, further comprising a wiring branch hole formed in the rotating frame and configured to allow the wiring to branch to be connected to a first motor.

10. The device of claim 1, wherein the headrest frame is covered with a headrest pad, the headrest pad including:
    a first pad configured to support a head of a passenger during driving; and
    a second pad having a thickness that is thinner than a thickness of the first pad and configured to support the head of the passenger while the passenger takes a rest.

11. The device of claim 1, wherein, when an electric seat is in a normal position and a gear shift lever is located at a rear (R), neutral (N), or driving (D) stage, a controller is configured to select an operation mode and control the headrest in the operation mode, wherein in the operation mode, a first pad is located on a front side of the headrest and, simultaneously, a second pad is located on a rear surface of the headrest.

12. The device of claim 1, wherein when an electric seat is in a relaxation position and a gear shift lever is located at a P stage, a controller is configured to select a rest mode and control the headrest in the rest mode, wherein in the rest mode, the headrest is rotated at an angle of 180 degrees, a second pad is located on a front surface of the headrest and, simultaneously, a first pad is located on a rear surface of the headrest.

\* \* \* \* \*